(No Model.)
A. E. BROCKETT.
MILK CAN.
No. 305,505. Patented Sept. 23, 1884.
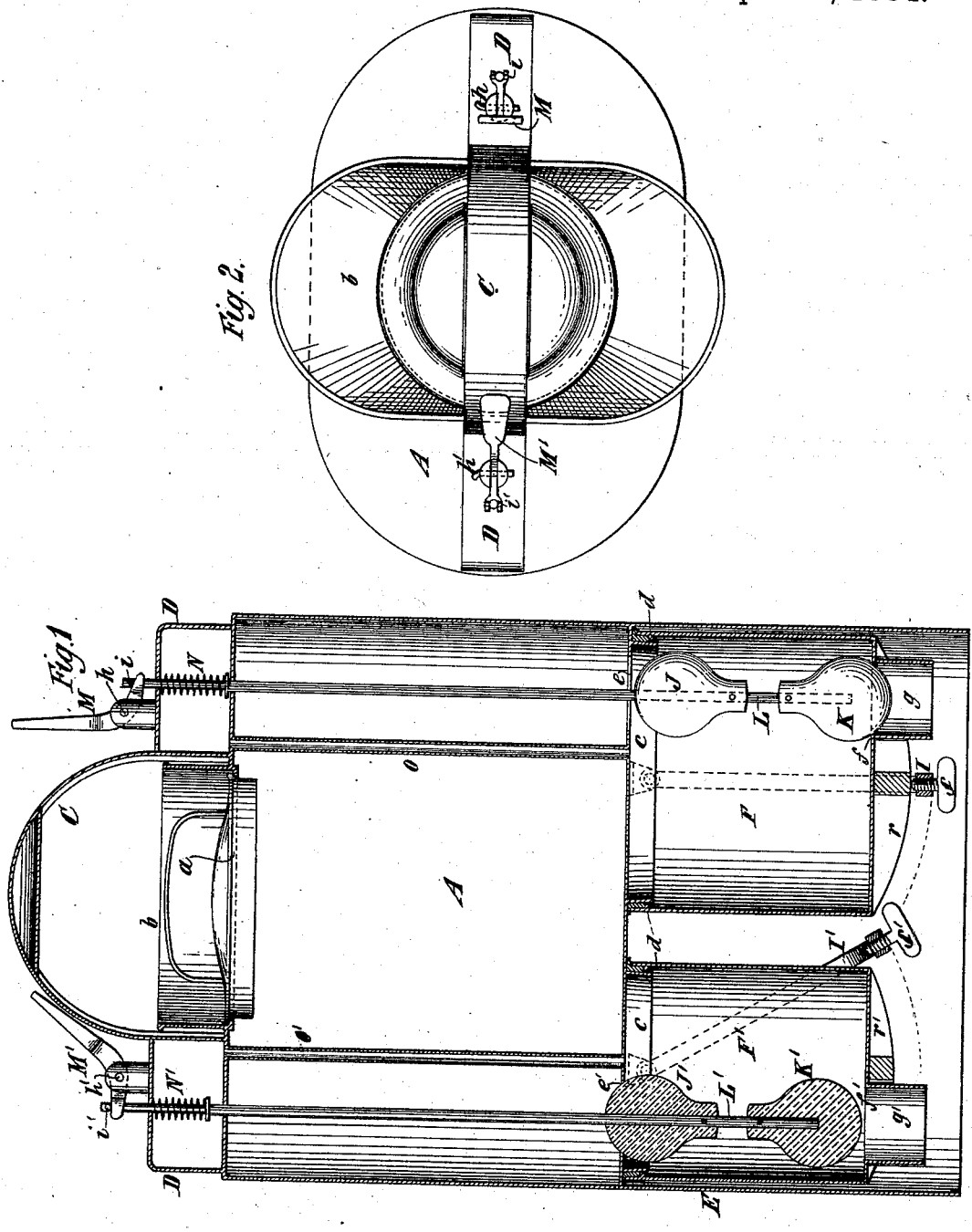

UNITED STATES PATENT OFFICE.

ATWATER E. BROCKETT, OF BRANFORD, CONNECTICUT, ASSIGNOR OF ONE-HALF TO CHARLES F. BRADLEY, OF SAME PLACE.

MILK-CAN.

SPECIFICATION forming part of Letters Patent No. 305,505, dated September 23, 1884.

Application filed March 21, 1884. (No model.)

*To all whom it may concern:*

Be it known that I, ATWATER E. BROCKETT, of Branford, in the county of New Haven and State of Connecticut, have invented a certain new and useful Improvement in Milk-Cans, of which the following is a specification.

I will describe a milk-can embodying my improvement, and then point out the various features in claims.

In the accompanying drawings, Figure 1 is a vertical section of a milk-can embodying my improvement, and Fig. 2 is a top view of the same.

Similar letters of reference designate corresponding parts in both figures.

A designates a reservoir or fount in which a supply of milk is to be kept. As here shown, it is of oval form, or is composed of opposite flat portions and intervening semicircular portions. It has a centrally-arranged mouth, $a$, surrounded by a flange, $b$. The mouth may be closed by a removable cover, B. Over the mouth and cover extends a handle, C, by which the can may be carried. On opposite sides of the flange $b$, and extending thence to the top of the reservoir, are bridge-pieces D. Below the reservoir A extends a petticoat, E, corresponding in shape with the reservoir and inclosing measuring-chambers F F'. These are intended to be of different sizes—one, F, having, for instance, a capacity of a quart, and the other, F', of a pint. The reservoir, the petticoat extending therefrom, and the measuring-chambers may be advantageously made of sheet metal—such, for instance, as tinned iron. The measuring-chambers are shown as made cylindric in form. They are open at the top, and are fitted to the bottom of the reservoir. As here shown, downwardly-tapering rims $c$ extend from the bottom of the reservoir, and flanges $d$ extend inwardly from the interior of the measuring-chambers. Packing-rings, preferably consisting of strips of leather coiled into circular form, with their ends meeting, are fitted into the measuring-chambers above the flanges $d$. The measuring-chambers are slipped around the rims $c$, and the packings form tight joints between them and the rims. The measuring-chambers will preferably be secured in place in such manner that they may be readily removed for cleaning. As shown, they are secured in place by yokes I I', pivotally secured to brackets affixed to the bottom of the reservoir, so that they can be swung under the bottoms of the measuring-chambers to support them or away from them to release them. The bottoms of the measuring-chambers are provided with ridges $r\ r'$, and the yokes are furnished with clamping-screws $s\ s'$, which may be manipulated to impinge on the ridges and secure the yokes in place under the measuring-chambers. In the bottom of the reservoir, over the measuring-chambers, are openings $e\ e'$, preferably of circular form, through which milk may pass from the reservoir into the measuring-chambers. In the bottom of the measuring-chambers are openings $f f'$, through which milk contained in the measuring-chambers may be discharged. As shown, the openings $f f'$ are in line with the openings $e\ e'$. From the bottom of the measuring-chambers around the openings $f f'$, nozzles $g\ g'$ extend. They facilitate the delivery of milk from the measuring-chambers into any receptacles.

J J' designate valves for controlling the passage of milk from the reservoir into the measuring-chambers through the openings $e\ e'$.

K K' designate valves whereby the discharge of milk from the measuring-chambers through the openings $f f'$ will be controlled. The valves J K are secured to a rod, L, and the valves J' K' are connected to a rod, L'. By raising the rods L L' the openings $e\ e'$ will be closed by the valves J J', and so as to cut off communication between the measuring-chambers and the reservoir. At the same time the valves K K' will be opened, so as to permit the milk in the measuring-chambers to run out through the openings $f f'$ and nozzles $g\ g'$ into any receptacle held to receive it. When the rods L L' move down, the valves K K' close the openings $f f'$ and the valves J J' unclose the openings $e\ e'$. The measuring-chambers will then fill again. The valves and their rods are inserted from the under side of the reservoir. Of course either rod may be moved separately to operate its pair of valves. The valves may be made of india-rubber or leather slipped on the rods and secured by cross-pins or otherwise. The rods L L' may be operated in any suitable manner. As shown, they are pivotally connected to levers M M', which are fulcrumed by pins $h\ h'$ to projections on the bridge-pieces D. At one end these levers extend close to the handles C, and at the other end they extend under pins $i\ i'$ on the rods L L'. Springs N N' are arranged between the bridge-pieces D and collars $j\ j'$, affixed to the rods. By pressing on the ends of the levers adjacent to the handle C the rods L L' may be raised. On releasing the levers the springs will depress the rods.

O O' designate air-pipes extending from the measuring-chambers through the reservoir to the outside thereof, so as to let the air out of the measuring-chambers when the milk flows in, and into the measuring-chambers when the milk flows out.

This can will not only be found convenient, but will avoid much waste of milk incident to transferring it from a can to a measure and thence to a receptacle.

What I claim as my invention, and desire to secure by Letters Patent, is—

1. In a milk-can, the combination of a reservoir, a circumferential petticoat arranged upon and below said reservoir, a detachable measuring-chamber, also arranged below the reservoir and within said petticoat, an opening through which milk may pass from the reservoir to the measuring-chamber, an opening through which milk may be discharged from the measuring-chamber, and valves for the openings arranged within the measuring-chamber upon one support, so combined that when said support is moved in one direction one of said valves will operate to close the opening from the reservoir to the measuring-chamber, and when the said valves are moved in the opposite direction the other of said valves will operate to close the discharge-opening from the measuring-chamber, substantially as specified.

2. In a milk-can, the combination of a reservoir, A, a circumferential petticoat, E, arranged upon and below said reservoir, a detachable measuring-chamber, F, also arranged below the reservoir and within said petticoat, an opening, $e$, through which milk may pass from the reservoir to the measuring-chamber, an opening, $f$, through which milk may be discharged from the measuring-chamber, valves J and K for said openings, a rod, L, a lever, M, and spring N, substantially as specified.

3. In a milk-can, the combination of a reservoir, a detachable measuring-chamber arranged below the reservoir, an opening through which milk may pass from the reservoir to the measuring-chamber, an opening through which milk may be discharged from the measuring-chamber, two valves for controlling said openings, arranged on one rod and adapted to be inserted from the bottom of said reservoir, and means for operating the valves, extending through the top of the reservoir adjacent to a handle of the can, substantially as specified.

4. In a milk-can, the combination of a reservoir, A, a detachable measuring-chamber, F, arranged below the reservoir, an opening, $e$, through which milk may pass from the reservoir to the measuring-chamber, an opening, $f$, through which milk may be discharged from the measuring-chamber, valves J and K, arranged upon one rod and adapted to be raised and lowered for controlling the openings, and an air-pipe, O, extending from the measuring-chamber through the reservoir to the outside of the can, substantially as specified.

5. In a milk-can, the combination of a reservoir, a detachable measuring-chamber arranged below said reservoir, and a securing device, substantially as described, for detachably fastening said chamber to said reservoir, substantially as specified.

ATWATER E. BROCKETT.

Witnesses:
T. J. KEANE,
EDWARD T. ROCHE.